Jan. 7, 1964     T. E. RAGSDALE     3,116,717
CATTLE INSECTICIDE APPLICATOR
Filed Feb. 5, 1962     2 Sheets-Sheet 1
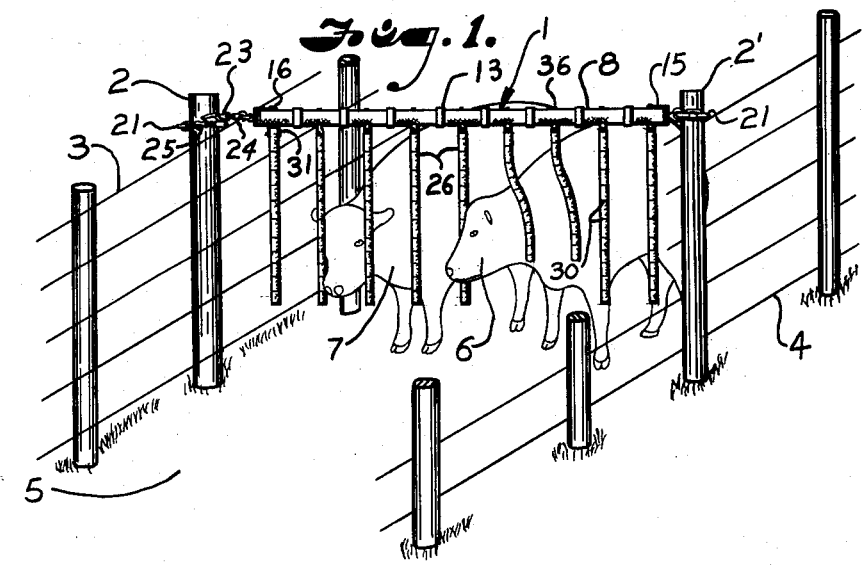
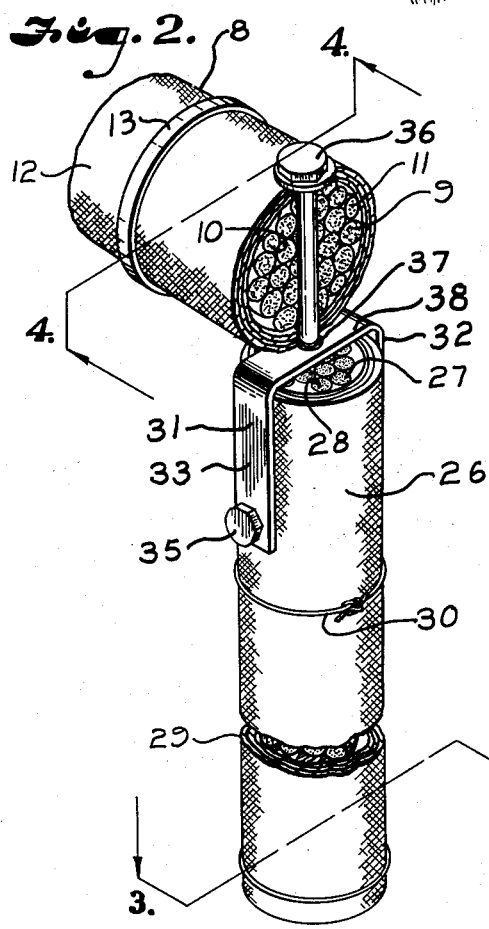
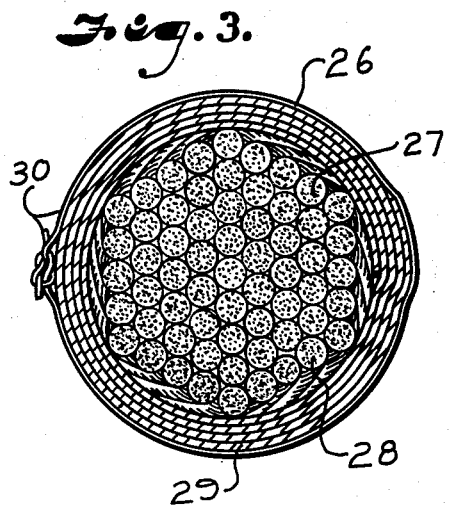
INVENTOR.
THOMAS E. RAGSDALE
BY
*Fishburn & Gold*
ATTORNEYS Jan. 7, 1964 T. E. RAGSDALE 3,116,717
CATTLE INSECTICIDE APPLICATOR
Filed Feb. 5, 1962 2 Sheets-Sheet 2
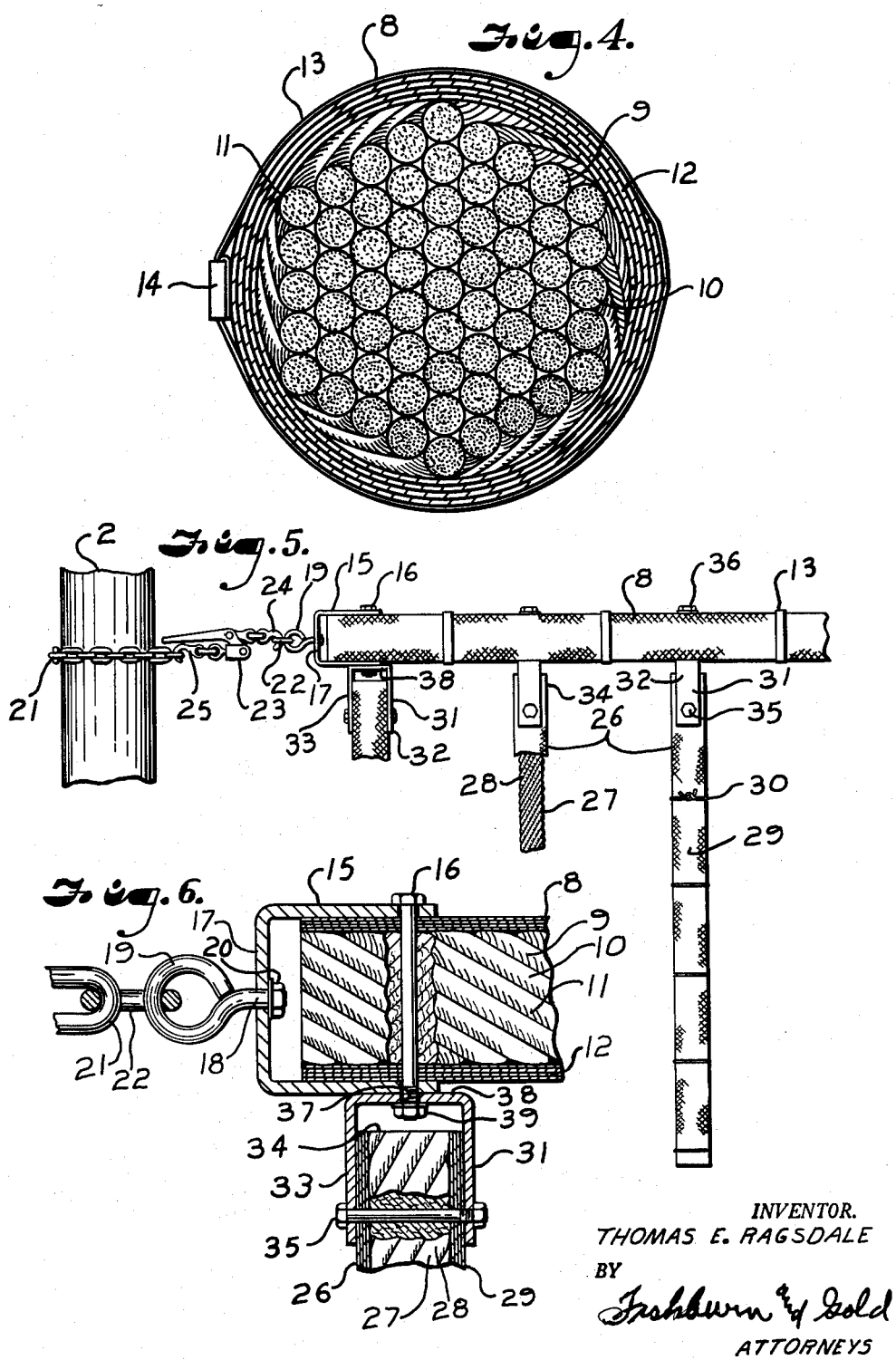
INVENTOR.
THOMAS E. RAGSDALE
BY
Fishburn & Gold
ATTORNEYS

3,116,717
CATTLE INSECTICIDE APPLICATOR
Thomas E. Ragsdale, R.R. 1, Lonejack, Mo.
Filed Feb. 5, 1962, Ser. No. 171,029
1 Claim. (Cl. 119—157)

This invention relates to an insecticide applicator to livestock, and more particularly to apparatus for applying an insecticide or oil to livestock by flexible members which are saturated with such insecticide or oil.

Still more particularly the apparatus is adapted to applying insecticide to cattle to repel face flies, horn flies, heel flies, lice, ticks and the like.

Face flies particularly the last couple of years have pestered cattle by lighting on the face and cluster around the eyes, nose and mouth of the cattle feeding on mucus causing much irritation. Face flies are not the blood sucking insects as are some of the other insects which infect cattle. They also gather on the withers, neck, brisket, legs and sides of animals feeding on saliva deposits. The flies also feed on blood that oozes from an open wound and, therefore, may be carriers of diseases. The face flies become so bad in certain seasons that the cattle will not remain in the pastures to eat the forage, but due to the flies pestering them they will remain in sheds or heavily shaded areas where it is dark. The flies will leave the face of the animals in the dark, therefore, cattle will not get enough food to continue to stimulate their growth and even in bad seasons will lose weight.

Probably the biggest complaint farmers had was that the flies caused severe outbreaks of pink eye, sometimes infecting the whole herd, and in severe cases causing blindness to be permanent; however, others reported that the cattle recovered after being fed a ration containing a high vitamin A content.

The cattlemen in central and southern midwestern areas suggest much stronger emphasis on connection between face flies and pink eye. Some cattlemen were able to control the flies in feed lots, but in pasture or range conditions they were uncontrollable.

Private industry, colleges and government research have been working for a satisfactory control of such pests, but so far as applicant is aware no one has devised a satisfactory apparatus for applying an insecticide to the face, neck and shoulders of the animals to successfully repel face flies. They will also gather on the sides and other parts of the animal feeding on saliva deposits, the animals throwing the saliva on their shoulders and sides by swinging of their heads in an effort to dislodge the flies.

Heretofore, various mechanical apparatuses have been used in an attempt to repel insects such as that shown in the patent to Caldwell, No. 2,785,653, and Kirk No. 2,581,028, which include rubbing elements fastened at each end fed from a container of insecticide through pumping apparatus due to the animals rubbing on the rubbing elements.

It has been found that the oridinary cattle oilers will not successfully prevent face flies because they do not apply insecticide to the area of the mouth and nostrils, area of the eyes, sides of the neck, lower part of shoulders and sides of cattle. These being the parts of the animal where face flies almost invariably light to feed upon the mucous secretions and saliva deposits found there. My present apparatus is devised for forced passage of the animals under the apparatus whereby they will be contacted by the depending flexible members from the header and even the header itself whereby the animals' withers and back rub the header as they go through.

My present apparatus is ideally suited for forced application of insecticide to animals. This to be accomplished by installation of the apparatus, wherever possible, in a lane or gateway between two pastures or between a pasture and small lot where there is a salt trough of water tank. Thus animals are forced to pass under the apparatus and receive an application of insecticide as they pass through the lane or gateway.

However, when installation in a lane or gateway is not possible the apparatus is to be installed between two posts at a right angle to a salt trough or water tank, thus animals will pass under the apparatus and contact insecticide as they circulate around such salt trough or water tank.

My apparatus may be placed adjacent feed troughs or salt licks or troughs and at a right angle to one end so that the animals will pass thereunder in going around the trough.

The principal object of the present invention is to provide apparatus to be suspended between two supports such as posts in a lane or gateway through which the cattle must pass and in passing will contact the apparatus by their heads and particularly the face and around the eyes and then back along the body of the animal so that the insecticide will be deposited on the animal's face and body to repel the insects.

Other objects of the present invention are to provide a header element consisting of a burlap wrapped member which will be provided with a wick for soaking up and retaining the insecticide; to provide means for suspending the header element to support in a place where the cattle will have to pass through and contact the apparatus; to provide vertically suspended swinable insecticide containing members for contacting the face and body of the animals as they pass under and through the apparatus; to provide the header element with fibrous depending members spaced apart a distance approximately equal to the distance between the eyes of the animals; to provide the depending flexible members with a wick element such as jute, rope or the like having burlap or the like wrapped therearound and secured thereto by nylon cords or the like; to provide the header element with a burlap covering and secured to the wick element of jute or rope material by steel bands or the like; to provide means for securing the header element to the supporting posts including a tightener element, such as load binders; to provide means for securing the flexible depending members to the header element and to provide a device of this kind, simple and economical to manufacture.

Other objects and advantages of this invention will become apparent from the following description taken in connection with the accompanying drawings wherein are set forth by way of illustration and example certain embodiments of this invention.

FIG. 1 is a perspective view of my invention with the cattle passing therethrough.

FIG. 2 is an enlarged cross-sectional view showing the flexible suspended elements secured to the header element.

FIG. 3 is a cross-sectional view taken on a line 3—3, FIG. 2.

FIG. 4 is a cross-sectional view taken on a line 4—4, FIG. 2.

FIG. 5 is an enlarged partly fragmentary view showing the tightening element for stretching the header element to the supports.

FIG. 6 is an enlarged cross-sectional view particularly illustrating the fastening of the ends of the header elements to the chains for fastening such element to the supporting posts and also securing the flexible depending members to the header elements.

Referring more in detail to the drawings:

1 designates an insecticide applicator embodying the features of my invention shown attached to posts 2 and 2' of a fence 3 and 4 constituting a lane 5 through which animals, such as cattle, as indicated at 6 and 7 pass.

The apparatus 1 includes a header 8 consisting of a wick 9 which may be a rope or the like including a plurality of strands 10 wound or braided in the usual manner forming interstices therebetween, said strands consisting of a plurality of individual jute fibers, as indicated at 11. The wick 9 is covered with a plurality of layers of wrapping 12 consisting of an absorbent material such as burlap or other similar fibrous material and secured to the wick 9 by spaced steel strap members 13 applied by fasteners 14 by a device (not shown). Secured to each end of the header 8 are clips or clevices 15 by bolts or the like 16 which extend through the fibrous material 12 and the rope or wick member 9 as best illustrated in FIG. 6.

The cross bar 17 of the clevices 15 has an opening adapted to receive the shank 18 of an eye bolt 19 and held thereon by a nut 20. A chain 21 is secured to the eye bolt 19 for fastening each end of the header to the posts 2 and 2'. If desired, a link 22 may be secured to one of the eye bolts 19 and a load binder indicated at 23 having one of the grab hooks 24 secured to the link 22 and the other grab hook 25 secured to the chain 21 for tightening the stretching the header between the supporting posts 2 and 2'.

The primary insecticide dispensing device consists of a plurality of flexible members 26 spaced from each other and depending from the header 8. The flexible depending members are made substantially similar to the header member and consists of a wick 27 made from jute fibers or strands of rope material as indicated at 28 (FIG. 3). 29 represents a plurality of layers of burlap or the like wrapped around the wick 27 and held in place by spaced tie members 30, such as nylon cord or the like. I prefer a soft material so as not to injure the face and eyes of the animal.

The flexible depending members 26 are spaced from each other a distance of approximately 11 inches and are secured to the header 8 by clips or clevis members 31 and the legs 32 and 33 are secured to the upper ends of the ends 34 of the flexible members 26 by bolts or the like 35, extending transversely therethrough. The flexible members 26 are secured to the header 8 by passing bolts or the like transversely through the header 8 and the threaded portion thereof extending through an opening 37 in the cross bar 38 of the clips 31 and secured thereto by nuts 39 (FIGS. 2 and 6). It will be noted that the end depending members are secured to the clips or clevices 15 by the bolts 16, as illustrated in FIG. 6. The tie cords 30 are spaced approximately 6 inches apart vertically of the depending members and the steel strapping members on the header are spaced substantially equidistance between the depending members.

I have found that a wick or rope 9 of approximately 3 inches in diameter and wrapped with burlap or the like to a diameter of 3⅓ to 3¾ inches suitable for my purpose. The depending flexible members which are made of rope approximately 2 inches in diameter and wrapped with burlap to about 2½ to 2¾ inches are also suitable. While I have here shown the wick to be rope, other material may be utilized without departing from the spirit of my invention and also while I have here shown the device to be supported in a lane through which the animals pass, it may be in any position where the animals will pass naturally without being actually driven, as the more frequently contacted by the animals the more fly repellent the apparatus will be.

The insecticide which I have found suitable for my purpose is a mixture of lindane and DDT. To saturate the header and depending flexible members I take a container, preferably with a spout (not shown) and pour the mixture of insecticide over the header until it is thoroughly soaked. I also pour the insecticide onto the depending members in addition to that which will pass from the header by gravity to the flexible depending members. It will be obvious that some of the insecticide will soak through the openings 37 of the cross bar 38 of the clips 31 and thence saturate the flexible members by dropping or running down the clip members so that by saturating the header the flexible members will also be saturated. The saturation is made at intervals of two to five days depending upon the number of cattle passing through the apparatus and the temperature to which the apparatus is subjected.

When the header is supported between the posts 2 and 2' and tightened by the load binder 23 the apparatus is ready for use. The cattle, as indicated in FIG. 1, in passing under the header will contact the depending flexible members by their heads as particularly shown with the animal numbered 7, around the eyes and face. In passing on through, as indicated by the animal 6, the flexible members will rub against the shoulders and sides of the animal as it passes between the flexible members so that not only the faces of the animal but the necks, shoulders and sides thereof will also be subject to be contacted by the insecticide.

Other insecticides than those mentioned herein may be used and even oils and other material, particularly those used in drugs and the like for animals as well as ordinary flies, may be used.

It will be obvious from the foregoing that I have provided a new and improved apparatus particularly adaptable for applying an insecticide to the face and head of animals as well as the neck, shoulders and sides thereof to repel face flies and other insects from the animals.

I have found that placing the header 8 about four feet from the ground to be suitable for most animals and particularly yearlings or older. The header 8 will contact the withers or top of the shoulders of the animals and rub over their backs as illustrated in FIG. 1. The depending flexible members 26 are of a length to extend below (approximately four inches) the nose of the animals when in ordinary walking position.

It is to be understood that while I have illustrated and described one form of my invention, it is not to be limited to the specific form or arrangement of parts herein described and shown except insofar as such limitations are included in the claim.

What I claim and desire to secure by Letters Patent is:

An apparatus for applying an insecticide to the face and around the neck, eyes and nose of animals comprising:
 (a) spaced supports,
 (b) a wick member, said wick member, consisting solely of an insecticide absorbent material,
 (c) means attaching said wick member to said supports,
 (d) a plurality of flexible insecticide absorbent members depending from said wick member, said depending members being of a length and spaced apart to contact the face and around the neck, eyes and nose of the animals,
 (e) and means for attaching said depending members to said wick member, said means including spaced openings transversely of and vertically of said wick member, bolts of smaller diameter than said openings, U-shaped brackets carried by said bolts below said wick member and bolts extending transversely through said brackets and said depending members whereby the insecticide will pass from the wick member through said openings thereon and gravitate therefrom to said brackets and said depending members to saturate the same.

References Cited in the file of this patent

UNITED STATES PATENTS

| | | |
|---|---|---|
| 987,433 | Crawford | Mar. 21, 1911 |
| 1,053,019 | Erickson | Feb. 11, 1913 |
| 1,129,977 | Hagny | Mar. 2, 1915 |
| 1,439,096 | Golphin | Dec. 19, 1922 |
| 2,688,950 | McKinley | Sept. 14, 1954 |
| 2,702,020 | Worden | Feb. 15, 1955 |
| 2,804,047 | Rogers | Aug. 27, 1957 |
| 2,845,897 | Pelc | Aug. 5, 1958 |
| 2,904,007 | Elfgren | Sept. 15, 1959 |
| 2,956,543 | Kirk | Oct. 18, 1960 |